United States Patent [19]

Salaba et al.

[11] Patent Number: 5,004,351

[45] Date of Patent: Apr. 2, 1991

[54] REACTION INJECTION MOLDING MACHINE

[75] Inventors: Timothy A. Salaba, Burnsville; Debra L. Wilfong, Lake Elmo, both of Minn.

[73] Assignee: Minnesota Mining & Manufacturing Company, St. Paul, Minn.

[21] Appl. No.: 182,910

[22] Filed: Apr. 18, 1988

[51] Int. Cl.$^5$ .............................................. B01F 15/04
[52] U.S. Cl. ........................................ 366/152; 137/597; 137/625.48; 222/134; 222/135; 222/310; 222/330; 366/160
[58] Field of Search .................. 366/76, 150, 152, 160, 366/161, 162, 142, 134, 154; 222/134, 135, 137, 310, 330; 137/625.48, 597

[56] References Cited

U.S. PATENT DOCUMENTS

| | | | |
|---|---|---|---|
| 3,712,513 | 1/1973 | Ashmead et al. | 222/134 |
| 3,901,408 | 8/1975 | Boden et al. | 222/134 |
| 3,908,862 | 9/1975 | Chandra et al. | 222/63 |
| 3,908,866 | 9/1975 | Brown | 222/135 |
| 4,003,501 | 1/1977 | Ramazzotti et al. | 222/135 |
| 4,043,486 | 8/1977 | Wisbey | 222/134 |
| 4,121,738 | 10/1978 | Virag | 222/134 |
| 4,150,767 | 4/1979 | Pitches et al. | 222/23 |
| 4,169,544 | 10/1979 | Blanchet | 222/134 |
| 4,170,319 | 10/1979 | Suh et al. | 222/134 |
| 4,189,070 | 2/1980 | Macosko et al. | 222/134 |
| 4,211,345 | 7/1980 | Taubenmann | 222/134 |
| 4,275,822 | 6/1981 | Juffa et al. | 222/63 |
| 4,279,360 | 7/1981 | Hauser | 222/1 |
| 4,281,777 | 8/1981 | Akens | 222/134 |
| 4,290,700 | 9/1981 | Hudimac, Jr. | 366/76 |
| 4,312,463 | 1/1982 | Daby | 222/134 |
| 4,363,426 | 12/1982 | Heinzl et al. | 222/134 |
| 4,366,918 | 1/1983 | Naka | 222/134 |
| 4,386,716 | 6/1983 | Buck | 222/37 |
| 4,432,469 | 2/1984 | Eble et al. | 222/134 |
| 4,471,887 | 9/1984 | Decker | 222/135 |
| 4,494,676 | 1/1985 | Berweger | 222/63 |
| 4,501,549 | 2/1985 | Abramov et al. | 425/542 |
| 4,515,296 | 5/1985 | Surdilla | 222/134 |
| 4,520,947 | 6/1985 | Alhausen et al. | 222/63 |
| 4,523,696 | 6/1985 | Commette et al. | 222/135 |
| 4,565,511 | 1/1986 | Ramisch | 425/146 |
| 4,580,699 | 4/1986 | Black et al. | 222/64 |

Primary Examiner—Robert W. Jenkins
Attorney, Agent, or Firm—Kinney & Lange

[57] ABSTRACT

A reaction injection molding machine provides for independent spring actuation of pistons in metering cylinders. Individual compression of the springs is provided by hand screw compression mechanisms. The pressure level of the liquid in each metering cylinder is adjusted to a desired level of pressurization by the total energy transferred to the springs. Impingement mixing of liquid streams from each metering cylinder is synchronized by a valving rod which includes a plurality of mixing heads. Upon appropriate positioning, a mixing head opens an orifice from each metering cylinder to allow streams of liquid to be expelled into impinging contact. The resultant product is directed by the mixing head into a separate collection vessel associated with that mixing head where the product may react and solidify.

16 Claims, 5 Drawing Sheets

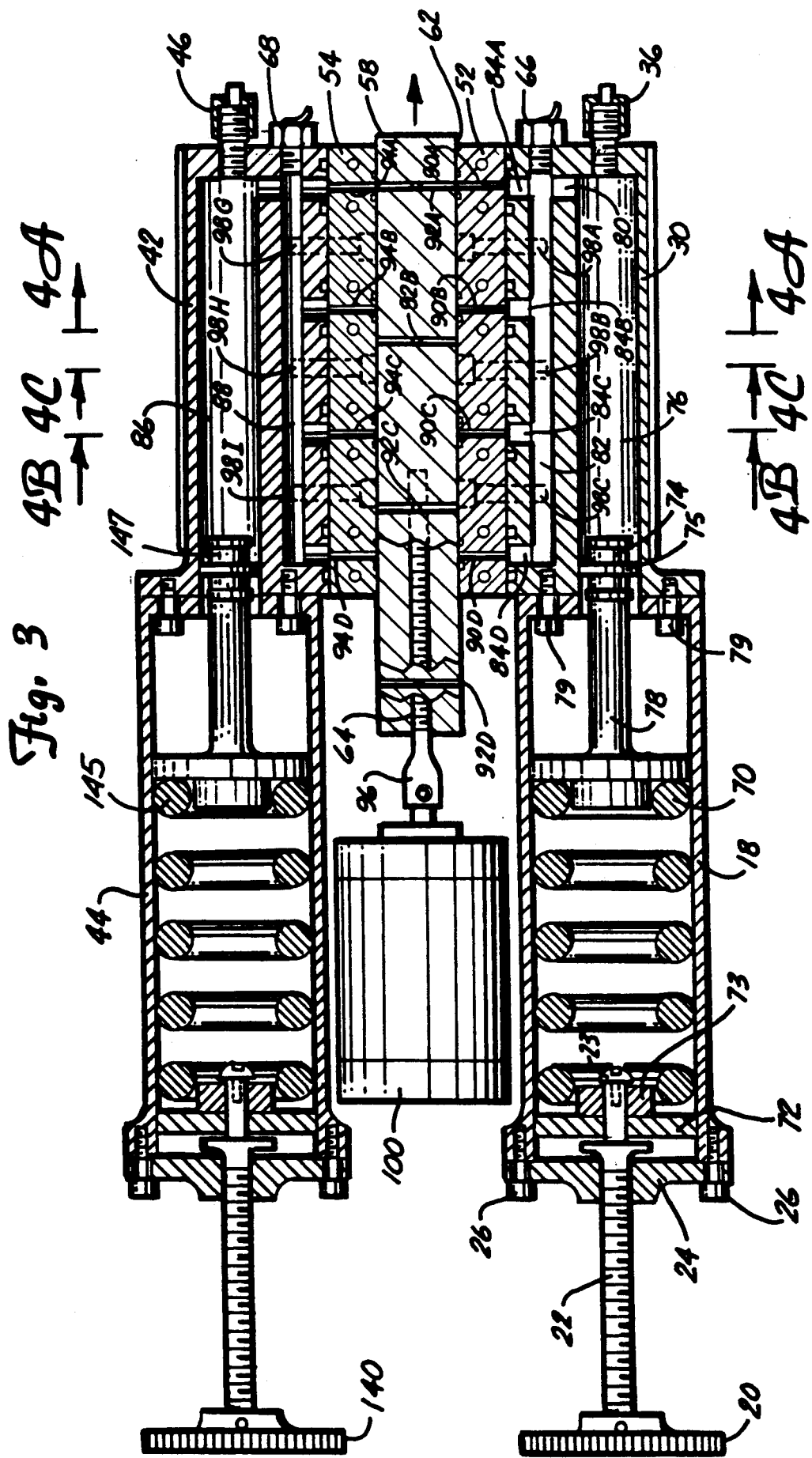

REACTION INJECTION MOLDING MACHINE

BACKGROUND OF THE INVENTION

1. Field of the Invention.

The invention is directed to an apparatus for accurately metering and mixing two or more materials, commonly to initiate a polymerization reaction, and for collecting the resultant product in a selected one of a plurality of collection vessels.

2. Description of the Prior Art.

Reaction injection molding ("RIM") is the injection into a mold of a mixture of two or more liquid reactants which rapidly react upon impingement or in a heated mold to form a polymer such as a polyurethane, a polyamide, a polyester, or the like. The reactants must be present in the mixture in the appropriate stoichiometric proportions and must be thoroughly mixed with one another to achieve the best results. RIM may also be used to blend reagents.

The reactants in RIM systems are impingement mixed. That is, two or more streams of liquid reactants are directed into collision in the mixing head of a RIM apparatus. The volume/time rates of flow of the reactants in their respective streams correspond with the appropriate stoichiometric ratios required for the reaction. The collision of the streams should be as direct as possible given the number of colliding streams. For two liquid reactants, jets are provided which typically direct streams in nearly headon collision.

Studies have indicated that thorough mixing is dependent upon achieving a sufficiently high Reynolds number for each impinging stream. The Reynolds number for any given stream is a dimensionless quantity and is a function of the fluid density, the average of velocity of the fluid stream, the hydraulic diameter of the jet through which the stream passes and the fluid's viscosity. The formula for determining Reynolds numbers appears elsewhere, for example, in U.S. Pat. No. 4,189,070 by Macosko et al, issued Feb. 19, 1980. For a given fluid, density and viscosity are a function of temperature and pressure. In a RIM apparatus, hydraulic diameter, the average velocity, and the temperature of the fluid streams may be adjusted to achieve an appropriate Reynolds number.

Prior art devices have been primarily directed to an industrial setting. In an industrial setting, the devices have had hydraulic drive components available for driving reciprocating pistons in cylinders to attain the required high pressures. Few systems have been provided which are appropriate or are directed to experimentation with the compounds produced by reaction injection molding. Even the device of the Macosko et al patent, which is nominally directed to laboratory research, employs gas or hydraulic driven power to pressurize the reactants.

Prior art RIM machines have been large and relatively immobile. A need for a portable device, of low enough weight and small enough size to be readily moved and manipulated has not been met. Such a portable RIM device could be used for quality control and process development in both research and in industrial settings. A portable RIM device would be particularly amenable for use in microgravity environments, such as found on a space shuttle in orbit, for the manufacture of polymer materials with potentially novel and advantageous properties resulting from distinctive microstructures or molecular morphologies which may form in such an environment. A portable RIM apparatus should also be highly modular to allow it to work with a variety of reagents, e.g. particulate containing fluids.

SUMMARY OF THE INVENTION

The present invention provides a portable RIM apparatus comprising a plurality of displacement cylinders for dispensing reagents under high pressure at selected volume/time rates of flow. A piston is disposed in each displacement cylinder to permit pressurization of the fluid in the cylinder. Each cylinder functions as its own reagent reservoir and so need not be refilled after each injection is made. A replaceable compression spring is disposed in a spring cannister behind each piston to allow pressure to be applied to the piston. A screw mechanism or worm drive is provided to compress the spring until the indicated pressure of the reagent in the cylinder is at the desired pressure. The screw mechanism may be actuated mechanically by a hand crank or electro-mechanically by a small motor. Each cylinder is independently pressurized to achieve the appropriate rates of flow of the fluids for the desired mixing ratio.

The RIM apparatus or device provides a valving system and a plurality of mixing heads to allow a plurality of sample molds to be made without refilling the cylinder. Each cylinder communicates directly with a manifold. Each manifold includes a plurality of outlet orifices which are disposed in sets between manifolds to direct streams into impingement. The sets of orifices are disposed around a valving rod track. A valving rod is disposed to be moved in the track and normally closes the various orifice sets. Disposed within the valving rod are a plurality of spaced mixing heads, one corresponding to each set of outlet orifices, which connect sets of outlet orifices in serial fashion depending upon appropriate positioning of the valving rod. Mixing is thus synchronized by the valving rod. Each mixing head, as it communicates with its respective set of outlet orifices, allows injection of the mixed reagents into an individual mold. For a reaction, the temperature of the reactants may be controlled as the reactant mixture is introduced to the mold to initiate or accelerate the reaction process resulting in a polymer. A stepper motor is provided to control positioning of the valving rod.

BRIEF DESCRIPTION OF THE DRAWINGS

FIG. 3 is a top view of the machine taken along section lines 3—3 in FIG. 1.

DETAILED DESCRIPTION OF THE PREFERRED EMBODIMENT

Among the intended uses of the RIM apparatus of the present invention is research and development of materials in microgravity environments. Accordingly, the meaning of the term reagent as used herein is broader than commonly understood. Broadly, a reagent is any material, composition, or suspension which can be discharged in a stream by the present apparatus. Examples of categories of such reagents include not just reactant gases and reactant liquids, but gases suspended in liquids, liquids suspended in gases, solids suspended in any fluid or other combinations of the above, particularly suspensions of particulates which would ordinarily sediment in liquids or gases in an earth normal gravitational field.

Figure 1:
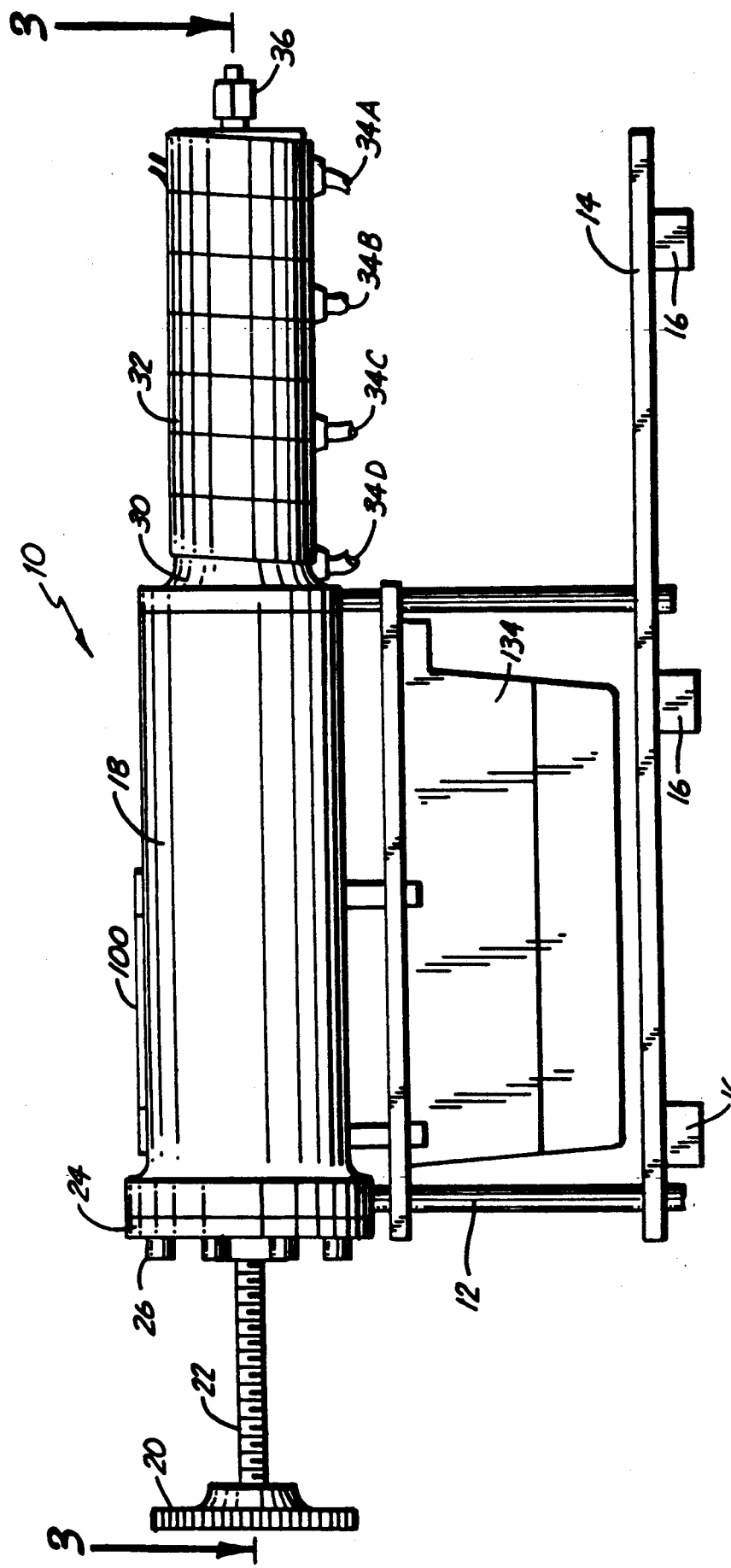
FIG. 1 is a side view of the machine according to the present invention.

As illustrated in FIG. 1, a preferred embodiment of the laboratory scale reaction injection molding ("RIM") apparatus 10 of the present invention is supported in a frame 12, which is in turn supported on an extended base plate 14. Base plate 14 has pads 16 allowing RIM apparatus 10 to rest on a work bench or table (not shown).

A spring cannister 18 is cradled on frame 12. Hand actuated pressurization knob 20 is connected to one end of a screw 22 which is disposed through a threaded opening in spring cannister closure plate 24. Spring cannister closure plate 24 is attached to spring cannister 18 by a plurality of retaining bolts 26 which may be removed to allow spring closure plate 24 to be removed to open cannister 18. A cylinder block 30 is flared at one end for attachment to spring cannister 18. Cylinder block 30 is wrapped with one or more resistive heating tapes 32. Projecting from the bottom of cylinder block 30 are a plurality of outlet nozzles 34A-D from which the resultant product of the mixed reagents is ejected from RIM apparatus 10 and directed to one or more separate collection vessels or molds (not shown). An access port to cylinder block 30 is closed by plug 36, which is partly visible coupled into one end of cylinder block 30. An indexer 134 is supported on frame 12 for operating stepper motor 100.

Figure 2:
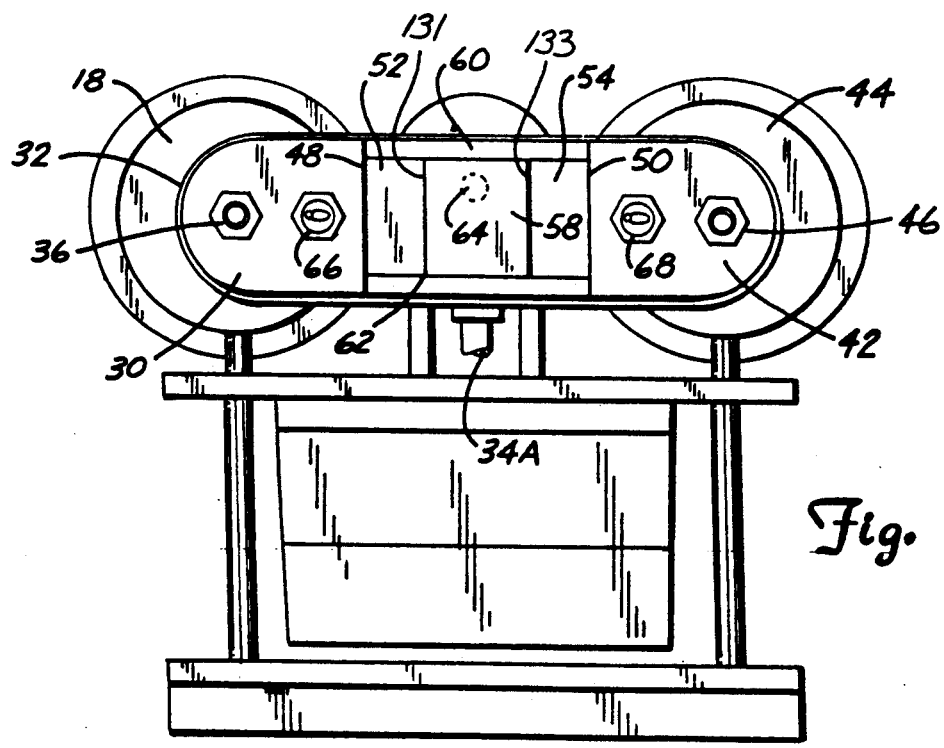
FIG. 2 is an end view of the machine.

FIG. 2 illustrates the relative position of two cylinder blocks to provide for impingement mixing of reagents or of the polymer forming reactants. Cylinder blocks 30 and 42 extend parallel to one another from spring cannisters 18 and 44.

Cylinder blocks 30 and 42 each include one flat outlet face, 48 and 50, respectively. Cylinder blocks 30 and 42 are oriented such that outlet faces 48 and 50 are parallel to one another. Each cylinder block includes a plurality of outlets (shown in FIG. 3) through outlet faces 48 and 50. Removably attached to outlet faces 48 and 50, respectively, are jet nozzle blocks 52 and 54. Jet nozzle blocks 52 and 54 each incorporate one jet nozzle for each outlet from cylinder blocks 30 and 42, respectively. Jet nozzle blocks are configured and positioned to present opposite, parallel faces to one another. Either jet nozzle block can be provided with fewer jet nozzles, thus providing selectability in reagent streams developed where more than two reagent cylinders are present.

A support plate 56 is disposed under jet nozzle blocks 52 and 54. Support plate 56 bridges the gap between opposite faces of blocks 52 and 54. Valving rod 58 fits snugly in a track 62 formed between seals set in opposite faces of jet nozzle blocks 52 and 54, and support plate 56 and cover plate 60.

A threaded shaft 96 (shown in FIG. 3) introduced to screw bore 64 (shown in shadow) allows valving rod 58 to be positioned in track 62.

Cylinder blocks 30 and 42 include cylinders accessible through plugs 36 and 46 and via pressure transducers 66 and 68. A source of heat such as a heating tape 32 is wrapped around blocks 30 and 42, support plate 56 and cover plate 60. Outlet port 34A may be seen to pass through support plate 56. Heating tape 32 is wrapped thereafter around the periphery of the apparatus.

FIG. 3 illustrates the disposition of two reagent storage and pressurization cylinders 76 and 86, providing reagents to be impingement mixed as a precursor to a polymer forming reaction.

The pressurization and reagent ejection directing apparatus of cylinders 76 and 86 are substantially identical, and, accordingly, the discussion herein will focus primarily on one cylinder, cylinder 76, with the understanding that the comments are equally applicable to either cylinder. It is also apparent that more than two cylinders may be provided to allow mixing of a greater plurality of reagents.

Cylinder 76 is a longitudinally extended, cylindrical opening in cylinder block 30. Cylinder 76 is closed at one end by plug 36 and at the other end by a side wall wipe reciprocating piston 74. Plug 36, or piston 74 can be removed to provide access to cylinder 76 for cleaning, or charging with reagent. Cylinder 76 forms a reagent receiving plenum in cylinder block 30 with manifold 82 and a connecting plenum 80. Manifold 82 is closed by a pressure transducer 66 through which the pressure of the liquid is measured.

Manifold 82 includes four ejection outlets 84A-D through which the fluid charge may be expelled from cylinder block 30. Outlets 84A-D are paired with nozzle jets 90A-D, respectively, in jet nozzle block 52, which is snugly abutted against and fixed to cylinder block 30. Each respective pair of outlets 84A-D and jet nozzles 90A-D is aligned permitting a fluid stream to pass from each outlet to its respective jet nozzle for ejection therefrom. It will be apparent to one skilled in the art that a plurality of manifolds can be provided for connection to cylinder 76.

When jet nozzles 90A-D are blocked by valving rod 58, preventing reagent from being ejected from cylinder 76, reagent in cylinder 76 is pressurized in order to attain an appropriate Reynolds number for effective mixing upon ejection. While jet nozzles 90A-D are closed, cylinder 76 may be filled with material by removing plug 36, filling cylinder 76 along with manifold 82 and communicating plenum 80. After filling, plug 36 is replaced and the liquid is pressurized by applying force to the material through reciprocating piston 74. Appropriate mixing ratios are typically achieved by applying different degrees of pressure to each cylinder while maintaining sufficient pressure to assure a suitable Reynolds number. Another method of achieving appropriate mixing ratios is by establishing different ratios between jet nozzle outlet hydraulic diameters. Alternatively, a different number of outlet nozzles could be opened from each cylinder to achieve desired mixing ratios.

Piston 74 is a side wipe type of piston, including at least a first piston seal 75. Piston 74 is mounted on a pushrod 78 which passes through an opening in the base of spring cannister 18.

In one preferred embodiment, push rod 78 terminates in a blunted end within cannister 18 which limits the travel of the pushrod and the piston into cylinder 76 to about 5 cm. Pushrod 78 also allows the use of various sizes of springs. The blunted end of pushrod 78 receives force generated by coil compression spring 70. Spring 70 is compressed by hand turning knob 20, thus turning screw 22 which is cooperatively threaded through closure plate 24 to urge compression plate 72 against compression spring 70. Screw 22 may be turned as slowly as desired to minimize instantaneous power requirements while storing energy therein.

Liquids are essentially incompressible. Accordingly, spring 70 is compressed as knob 20 is turned, displacement of screw 22 being transmitted to spring 70 via plate 72 which is supported on screw 22 by support 73. Support 73 is attached to screw 22 by fastener 23. Energy is stored as a result of work done compressing spring 70. Force generated by spring 70 is transmitted as pressure on reagent in cylinder 76 via piston 74 disposed on push rod 78. Knob 20 is turned until pressure transducer 66 indicates that the appropriate pressure has been applied to the reagent in cylinder 76. An important advantage of springs over other motive force generating devices is their high acceleration. When valving rod 58 is moved to open a pair of jet nozzles, spring 70 will maintain the required pressure to maintain more than a minimum Reynolds number for adequate impingement mixing during ejection of the reagent. Another advantage of springs is that they replace bulky motors or heavy hydraulic units which would otherwise be used to provide motive force. This contributes to portability, compactness and flexibility of the machine. Those skilled in the art will realize that less compression of spring 70 of a given spring constant will occur for gaseous, compressible reagents.

Bolts 26 allow removal of closure plate 24, giving access to spring cannister 18. Spring 70 is removable and replaceable with springs of a suitable spring constant and compressability for the given liquid to be pressurized. Alternatively, pushrod 78 with piston 74 is removable to afford easier cleaning of cylinder 76 or to provide an alternative mode of filling cylinder 76 with reagent.

Bolts 79 may be removed to allow detachment and replacement of cylinder block 30, thus contributing to the overall modularity of the RIM machine.

Jet nozzle block 52 is attached to cylinder block 30 by six bolts, including 98A (98A-C being shown in shadow in FIG. 3). By removing slide valve 58 from the track formed between jet nozzle blocks 52 and 54, appropriate bolts 98 may be accessed for removal to allow removal and replacement of jet nozzle blocks 52 and 54. It is desirable to replace jet nozzle block 52 with jet nozzle blocks incorporating jet nozzles of larger or smaller hydraulic diameters, when the liquid to be introduced to the plenum is changed to one of a substantially different viscosity. Enhanced modularity is thus provided in the apparatus. The length of track 62 is determined by the length of the jet nozzle blocks 52 and 54 installed. The choice of jet nozzle block length is determined in part by the elongation of the manifold and the number of outlets from the manifold. Obviously, the elongation of valving rod 58 is determined by the number and spacing of the jet nozzles.

Jet nozzle blocks 52 and 54 are positioned substantially parallel to one another. The juxtaposition of blocks 52 and 54 aligns pairs of jet nozzles, 90A with 94A; 90B with 94B; 90C with 94C; and 90D with 94D, with one another. Jet nozzles 94A-D open to pressurized liquid stored in cylinder 86 via manifold 88.

Valving rod 58 fits snugly between seals 106 and 108 (shown in FIG. 4A) set in jet nozzle blocks 52 and 54, respectively. Seals 106 and 108 prevent the leakage of liquid between jet nozzle blocks 52 and 54 and valving rod 58. Valving rod 58 slides between jet nozzle blocks 52 and 54 in track 62 (shown in FIGS. 4A-C). Valving rod 58 can be positioned to block ejection of reagent from jet nozzles 90A-D and 94A-D, effectively closing each pair of jet nozzles. Four longitudinally diposed mixing heads 92A-D are disposed in valving rod 58 to permit the opening of one pair of aligned jet nozzles to fluid communication at a time (as shown in FIGS. 5A-D). Mixing head 92A is used to open jet nozzles 90A and 94A to one another. Mixing head 92B is used to open jet nozzles 90B and 94B to one another. Mixing head 92C is used to open jet nozzles 90C and 94C to one another and mixing head 92D is used to open jet nozzles 90D and 94D to one another.

Providing a plurality of mixing heads 92A-D allows a series of independent injection mixings to be done without cleaning a single mixing head after each use.

Valving rod 58 is a slide valve moved along its longitudinal axis by rotating threaded shaft 96 in a cooperatively threaded bore 64. A stepper motor 100 is provided to drive threaded shaft 96 for positioning valving rod 58. If desired, valving rod 58 may be positioned manually or by other appropriate means.

Figure 4A:
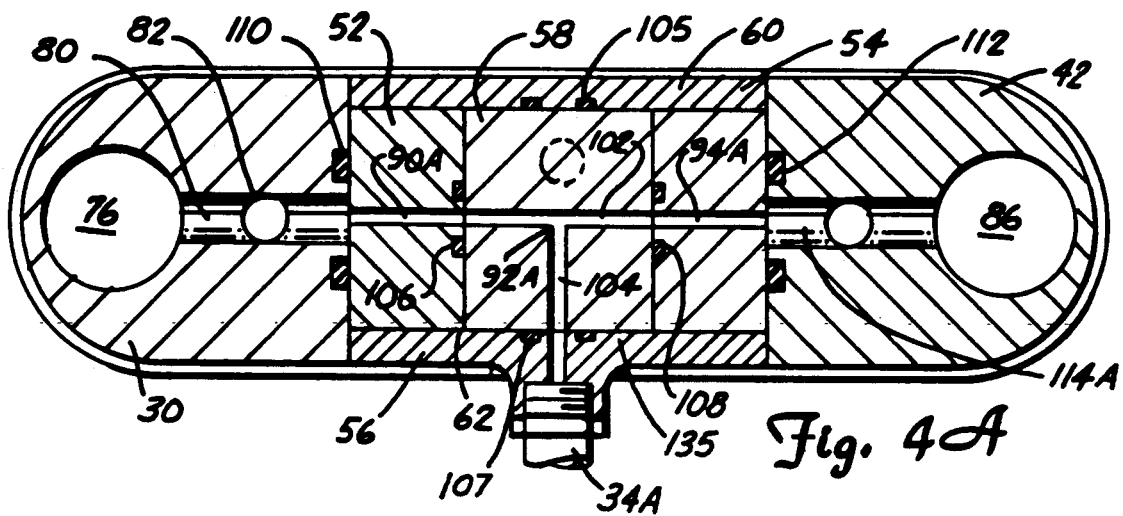
FIGS. 4A–C are section views taken along lines 4A–C of FIG. 3.
Figure 4B:
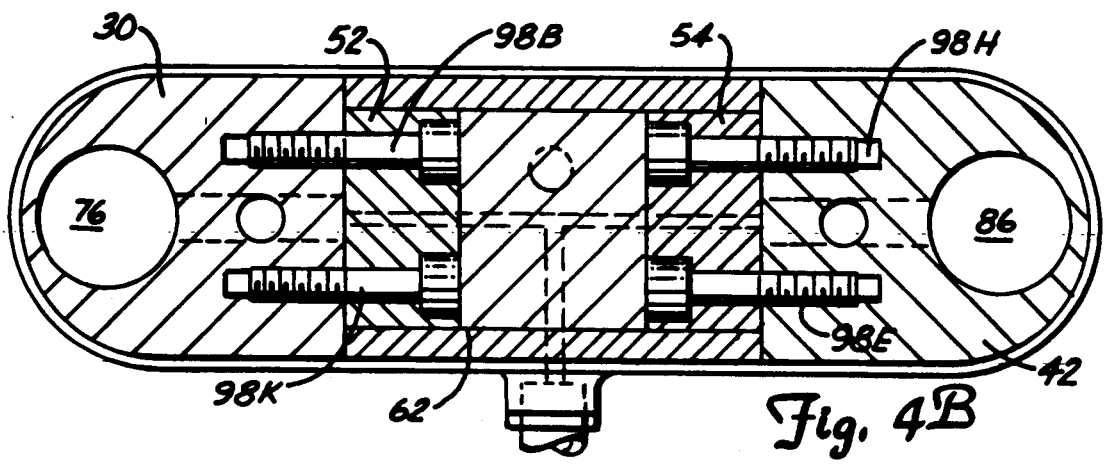
Figure 4C:
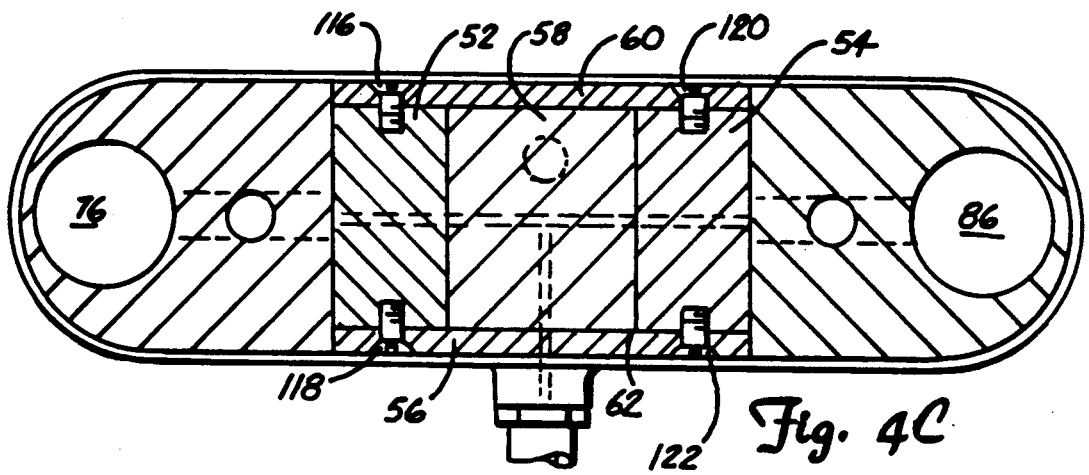

In FIGS. 4A-C, mixing head 92A is shown as a "T" shaped structure, or mixing tee. It will be clear to one skilled in the art that other geometries are possible, and even desirable where more than two reagents are to be mixed. FIG. 4A illustrates a mixing head 92A positioned between aligned jet nozzles 90A and 94A. Mixing head 92A is representative of mixing heads 92B-D and the discussion of it applies equally to mixing heads 92B-D. Mixing head 92A comprises a bore hole 102 passing completely through valving rod 58 which connect jet nozzles 90A and 94A upon appropriate positioning of valving rod 58. Lower face 135 of valving rod 58 abuts against seals 107 provided around outlet nozzles 34A-D (34B-D shown in FIG. 1) in support plate 56. Mixing head 92A further comprises a bore 104 introduced to valving rod 58 from lower face 135 and extends to intersect with bore 102. Liquid reagents are ejected from nozzles 90A and 94A into bore 102 from opposite ends thereof. The reagents impingement mix at or near the intersection of bores 102 and 104. The resultant product is ejected from mixing head 92A via bore 104 to outlet nozzle 34A. The resultant product may then be directed to a collection vessel (not shown) where, for example, the resultant product can be heated to react and form a polymer.

Seals 110 are disposed on the surface of cylinder block 30 around outlet ports 84A-D to eliminate leakage between block 30 and jet nozzle block 52. Seals 112 are likewise disposed on the surface of cylinder block 42 around outlet ports 114A-D to eliminate leakage between cylinder block 42 and jet nozzle block 54. Seals 106 are disposed around the outlet orifices of jet nozzles 90A-D preventing fluid leakage between jet nozzle block 52 and valving rod 58. Similarly, seals 108 are disposed surrounding the outlet orifices of jet nozzles 94A-D preventing fluid leakage between jet nozzle blocks 54 and valving rod 58. Another group of seals 105 are set in the inward face of cover plate 60 to contact valving rod 58. Seals 107 are disposed surrounding outlet nozzles 34A-D preventing fluid leakage between valving rod 58 and support plate 56. Seals 105, 106, 107 and 108 also function as resilient bearing surfaces across which valving rod 58 travels or moves.

FIG. 4B illustrates how jet nozzle blocks 52 and 54 are held against cylinder blocks 30 and 42, respectively. Two sets of bolts comprising bolts 98A-F and bolts 98G-L are used to connect replaceable jet nozzle blocks 52 and 54, respectively, to cylinder blocks 30 and 42. (Bolts 98D, 98F, 98J and 98L are not shown, bolts 98A, B, C, G, H and I are shown in shadow relief in FIG. 3).

FIG. 4C illustrates securing lower support plate 56 and upper plate 60 to jet nozzle blocks 52 and 54 to form a channel or track for valving rod 58. Sixteen bolts are used to retain each plate in place. For example, bolt 116 passes through plate 60 into block 52 and bolt 120 passes through plate 60 into block 54 to help secure upper plate 60 in position. Similarly, bolts 118 and 122 secure support 56 to blocks 52 and 54. The use of bolted assembly allows easy disassembly and substitution of jet nozzle blocks incorporating different diameter nozzles.

Figure 5A:
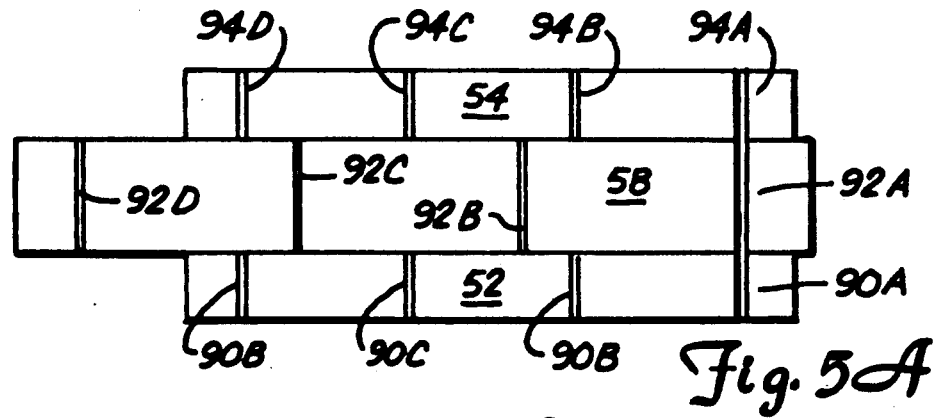
FIGS. 5A–D are schematic views of the sequential opening of each mixing head.
Figure 5B:
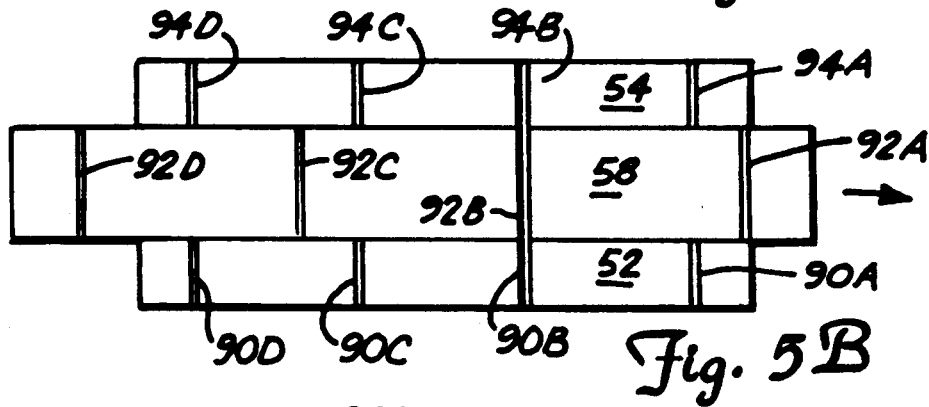
Figure 5C:
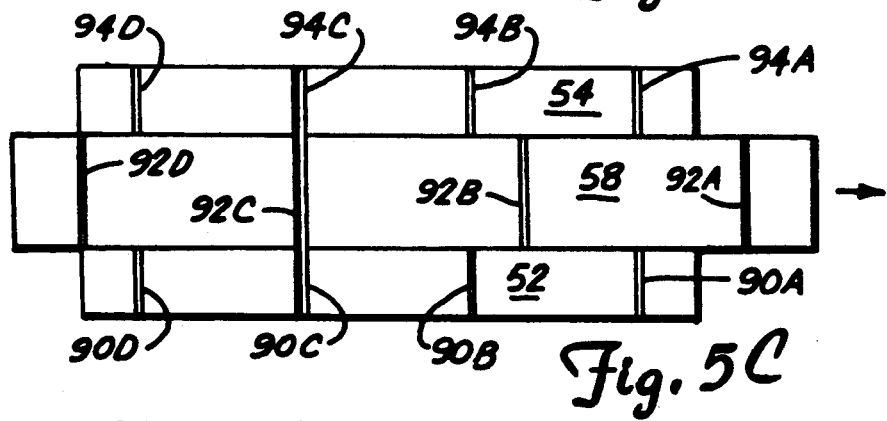
Figure 5D:
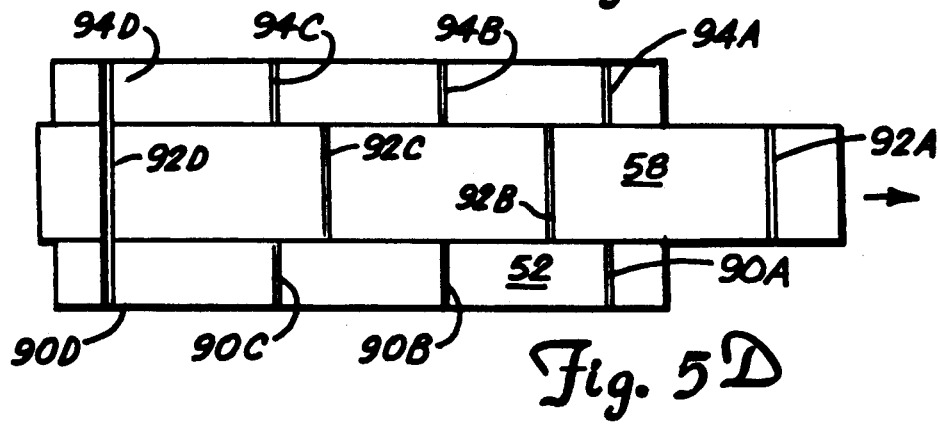

FIGS. 5A-D illustrate a staggered opening sequence between pairs of jet nozzles by valving rod 58. Mixing heads 92A-D are disposed along valving rod 58 for permitting one pair of opposed jet nozzles to be opened to fluid communication with one another at a time. Valving rod 58 can also be positioned to close all of nozzles 90A-D and 94A-D. It is apparent to one skilled in the art that valving rod 58 may be reconfigured to allow any combination of corresponding jet nozzles to be brought into communication simultaneously. In FIG. 5A, valving rod 58 is positioned to place mixing head 92A between nozzles 90A and 94A, opening the nozzles and permitting material to be ejected from nozzles 90A and 94A for mixing. In FIG. 5B, valving rod 58 is positioned to bring mixing head 92B between nozzles 90B and 94B to open the nozzle and permit mixing therebetween. In FIG. 5C, valving rod 58 is positioned to bring mixing head 92C between nozzles 90C and 94C. Finally, FIG. 5D illustrates mixing head 92D positioned between nozzles 90D and 94D.

Figure 6:
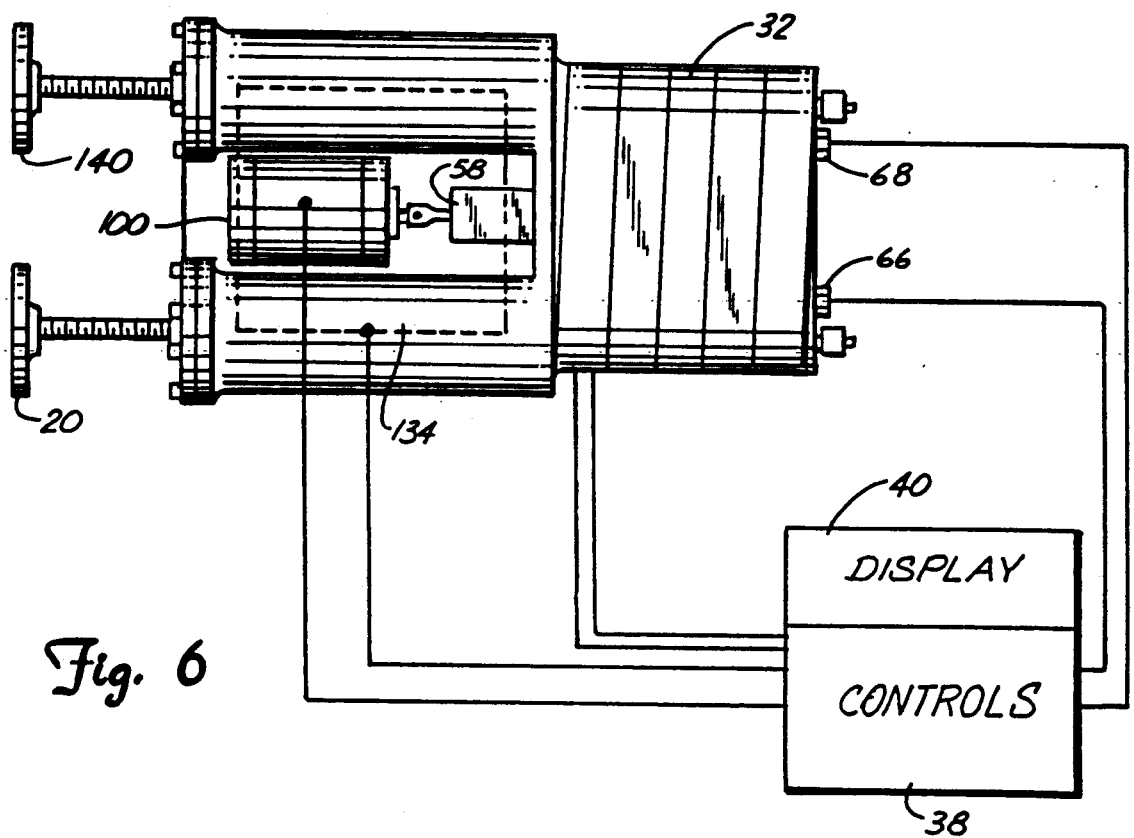
FIG. 6 is a control schematic.

A variety of controls can be used to direct operation of RIM machine 10 of the present invention. FIG. 6 illustrates a basic control arrangement for RIM apparatus 10. Stepper motor 100 positions valving rod 58 as elaborated above. Controls 38 and an associated indexer 134 control stepper motor 100 to appropriately position valving rod 58. Pressure transducers 66 and 68 are monitored and the pressures in manifolds 82 and 88 (shown in FIG. 3) are indicated on display 40. Control knobs 20 and 140 may be turned to adjust pressure to the desired level for each manifold. Controls 38 also energize resistive heating tape 32 to maintain the reagents stored in cylinders 76 and 86 (shown in FIG. 3) in a liquid state and at the appropriate temperature for mixing.

Operation of the device is simple. Where a stepper motor is used to control valving, only a single source of electric power is required. The electric power source can be adapted to a spacecraft, aircraft, household or industrial power system. No compressors, high acceleration motors or hydraulics are needed to support compression of the fluid. The compression springs may be compressed as slowly as desired by hand or by a motor. Thus, the RIM apparatus has low power requirements for storing energy in the spring. The springs provide excellent acceleration for the piston when a set of jet nozzles is opened for impingement mixing. Sufficiently stiff springs are used to insure substantially linear acceleration of the piston during the time a set of orifices is opened. Thus, the ratio of the reagent pressures between cylinder 76 and cylinder 86 remains substantially constant and the impingement mixing ratio remains substantially unchanged during mixing of a sample. Not only do the springs provide faster piston acceleration than can be provided by conventional motors and most hydraulics, the springs also allow a substantial reduction in the weight of the device. Because the valving rod synchronizes operation of the apparatus, there is no need to synchronize the pistons themselves. The stepper motor will move the valving rod after the filling of each mold.

There is no need to provide reservoirs to feed the displacement cylinders, in view of the adaption of the device to produce a plurality of samples at selected times. There is also no need to recharge cylinders where the devices are being used to produce samples in a variety of different gravitational environments. The present device is sized so that it can be easily carried on board a space shuttle or an aircraft such as the NASA'S KC-135 used to simulate low gravity environments. Accordingly, the present device may be used to produce samples of polymeric materials in microgravity environments. An exemplary apparatus, built in accordance with the teachings herein, fully charged, has a mass of no more than 18 kg and has a volume of about 0.03 cubic meters.

Each displacement cylinder and manifold of the exemplary machine holds up to approximately 32 cubic centimeters of useable reagents. The portability of the apparatus allows for use in such diverse environments as laboratories, factories, and space stations. To achieve an appropriate velocity of the fluid stream, the reagent must be sufficiently pressurized. Typically, high pressures are available from the RIM apparatus to insure Reynolds numbers of over 200 for each reactant. This will allow the impingement mixing of fairly heavy, potentially fiber laden viscous liquids. Modularity of the apparatus allows it to be used with a variety of reactants of different viscosities and densities.

Although the present invention has been described with reference to preferred embodiments, workers skilled in the art will recognize that changes may be made in form and detail without departing from the spirit and scope of the invention.

What is claimed is:

1. An apparatus for metering and mixing at least two fluid reagents and collecting a resultant product in at least a first collection vessel, the apparatus comprising:
   a plurality of reservoirs, each reservoir being adapted to contain a selected fluid reagent;
   means coupled to each reservoir for pressurizing the reagent contained therein to a desired pressure;
   a plurality of jet nozzles in fluid communication with each reservoir for developing streams of reagent expelled from the reservoirs;
   a valving rod including a plurality of mixing heads for opening selected sets of jet nozzles to one another for mixing, the mixing heads directing streams of reagents into impinging contact and for further directing the resultant product to a selected collection vessel; and
   means for positioning the valving rod against each of the plurality of jet nozzles in closure positions for closing all of the jet nozzles and in opening positions to bring at least a first set of the jet nozzles into fluid communication with one another through a selected mixing head for mixing of reagents expelled through the jet nozzles.

2. The apparatus as defined in claim 1, wherein each reservoir comprises:
   a pressurization reservoir; and
   a manifold including a plurality of outlet ports connected to the pressurization reservoir.

3. The apparats as defined in claim 2, wherein the jet nozzles associated with each reservoir are fluidly connected to the outlet ports of the manifold.

4. The apparatus as defined in claim 3, wherein the nozzles are disposed in replaceable modular blocks.

5. The apparatus as defined in claim 2, wherein the pressurization reservoirs are cylinders openable at at least one end thereof to permit filling of the cylinder with a reagent.

6. The apparatus as defined in claim 5, wherein the means for pressurizing for each pressurization cylinder comprises:
   a reciprocating piston in each of the cylinders;
   a replaceable spring for independently actuating each reciprocating piston;
   means for transferring energy to the spring; and
   means for coupling energy from the spring to the piston to pressurize the reagent in each cylinder to a selected pressure.

7. The apparatus as defined in claim 6, wherein the springs are replaceable compression springs.

8. The apparatus as defined in claim 7, wherein the compression springs are coil compression springs.

9. The apparatus as defined in claim 8, wherein the apparatus further comprises a pressure transducer coupled to each reservoir to generate a pressure indicating signal for providing guidance for compression of the compression spring for controlling the pressure of the fluid in each cylinder.

10. The apparatus as defined in claim 1, wherein the means for positioning the valving rod further includes an elongated track means for guiding the valving rod.

11. The apparatus as defined in claim 4, further comprising a plurality of sets of jet nozzles spatially distributed along the longitudinal axis of the track means, each set of jet nozzles including one nozzle in communication with each fluid regent reservoir, the jet nozzles of a set being juxtaposed, and when opened, directing impinging streams of reagent at one another.

12. The apparatus as defined in claim 5, wherein the valving rod is an elongated body supported on the track means with the longitudinal axis of the valving rod parallel to the longitudinal axis of the track means.

13. The apparatus as defined in claim 6, wherein a series of mixing heads are spatially distributed with respect to the longitudinal axis of the valving rod to allow staggered opening of one set of jet nozzles at a time.

14. An apparatus for metering and mixing at least two reagents and for collecting a resultant product in one of a plurality of collecting a resultant the apparatus comprising:
   a plurality of elongated, parallel manifolds;
   means for providing one reagent to each manifold at an independently selected pressure;
   a plurality of sets of jet nozzles, each set including one jet nozzle from each manifold, the jet nozzles of each set of nozzles being oriented to direct streams of liquid into impinging contact; and
   a valving rod with a travel adjacent the outlets of the jet nozzles for opening the outlets of a selected set of jet nozzles by appropriate positioning of the valving rod and for closing the outlets of the nozzle otherwise.

15. The apparatus as defined in claim 14, wherein the valving rod includes a plurality of mixing heads, one mixing head being associated with each set of jet nozzles for opening a selected combination of the jet nozzles when positioned between the nozzles, the nozzles otherwise being closed by the valving rod.

16. An apparatus for metering a fluid at a predetermined time rate of flow, the apparatus comprising:
   a piston;
   a cylinder adapted to receive the piston in a reciprocating fashion;
   a pushrod for supporting the piston in the cylinder;
   a replaceable compression spring;
   means for compressing the compression spring against the pushrod;
   a valved outlet of selected hydraulic diameter connected to the cylinder for releasing fluid therefrom; and
   a pressure transducer in communication with the interior of the cylinder for providing an indication of the pressure of the fluid in the cylinder.

* * * * *

UNITED STATES PATENT AND TRADEMARK OFFICE
CERTIFICATE OF CORRECTION

PATENT NO. : 5,004,351

DATED : April 2, 1991

INVENTOR(S) : Timothy A. Salaba et al.

Page 1 of 2

It is certified that error appears in the above-identified patent and that said Letters Patent is hereby corrected as shown below:

On the title page:

In the References Cited Section, under U.S. PATENT DOCUMENTS, insert the following:

| | | | |
|---|---|---|---|
| 3,952,920 | 4/1976 | Bergman. | 222/137 |
| 3,973,583 | 8/1976 | Sorenson | 137/625.48 |
| 4,118,799 | 10/1978 | Krueger. | 366/161 |
| 4,126,399 | 11/1978 | Schneider. | 366/161 |

In the References Cited Section, insert:

OTHER PUBLICATIONS

Ishida et al, "Fast Polymerization and Crystallization Kinetic Studies of Nylon 6 by Combined Use of Computerized Micro-RIM Machine and FT-IR"

Mikkelsen et al, "Characterization of Laboratory Scale RIM Machines," Oct. 1987

Col. 9, line 33, delete "claim 4", insert --claim 10--.

Col. 9, line 40, delete "claim 5", insert --claim 11--.

Col. 10, line 1, delete "claim 6", insert --claim 12--.

UNITED STATES PATENT AND TRADEMARK OFFICE
CERTIFICATE OF CORRECTION

PATENT NO. : 5,004,351

DATED : April 2, 1991

INVENTOR(S) : Timothy A. Salaba, et al

It is certified that error appears in the above-identified patent and that said Letters Patent is hereby corrected as shown below:

Col. 10, line 8, delete "collecting a resultant", insert --collection vessels--.

Signed and Sealed this

Twenty-second Day of September, 1992

Attest:

DOUGLAS B. COMER

Attesting Officer

Acting Commissioner of Patents and Trademarks